United States Patent [19]
Morris

[11] Patent Number: 5,582,500
[45] Date of Patent: Dec. 10, 1996

[54] INVERTING APPARATUS

[76] Inventor: Drew W. Morris, P.O. Box 10111, Greenville, S.C. 29603

[21] Appl. No.: 46,123

[22] Filed: Apr. 12, 1993

Related U.S. Application Data

[63] Continuation of Ser. No. 458,242, Dec. 28, 1989, abandoned, which is a continuation-in-part of Ser. No. 292,817, Jan. 1, 1989, Pat. No. 4,917,313.

[51] Int. Cl.$^6$ ........................................... B65F 3/04
[52] U.S. Cl. ................................ 414/422; 414/409
[58] Field of Search ........................ 414/425, 422, 414/423, 424, 403, 406, 407, 408, 409, 598, 592, 782

[56] References Cited

U.S. PATENT DOCUMENTS

| | | |
|---|---|---|
| 2,592,085 | 4/1952 | Van Doorne . |
| 2,808,947 | 10/1957 | Shippy ..................................... 414/409 |
| 3,035,725 | 5/1962 | Beaman et al. ...................... 414/422 X |
| 3,095,101 | 6/1953 | Zolle . |
| 3,417,888 | 12/1968 | Naab . |
| 3,732,997 | 5/1973 | Reavis et al. . |
| 3,804,277 | 4/1974 | Brown et al. . |
| 3,894,642 | 7/1975 | Shive . |
| 3,910,434 | 10/1975 | Ebeling et al. ...................... 414/420 X |
| 4,422,814 | 12/1983 | Borders . |
| 4,669,940 | 6/1987 | Englehardt et al. ................ 414/422 X |

FOREIGN PATENT DOCUMENTS

| | | | |
|---|---|---|---|
| 1255044 | 11/1967 | Germany ............................... 414/422 |
| 1277406 | 6/1972 | United Kingdom ................... 414/420 |

*Primary Examiner*—Frank E. Werner
*Attorney, Agent, or Firm*—Hardaway Law Firm P A

[57] ABSTRACT

An apparatus for inverting a container has a platform having laterally spaced rollers which ride within channel guides having a lower vertical portion and an upper arcuate portion. The lateral rollers ride within the channel guides from the platform being lifted and when reaching the upper arcuate portion, invert the container for emptying the contents thereof.

1 Claim, 4 Drawing Sheets

INVERTING APPARATUS

CROSS REFERENCE TO RELATED APPLICATION

This application is a continuation of application Ser. No. 07/458,242, filed Dec. 28, 1992 now abandoned, which is a continuation-in-part of application Ser. No. 07/292,817, filed Jan. 1, 1989, now U.S. Pat. No. 4,917,313.

BACKGROUND OF THE INVENTION

This invention relates generally to the art of mechanical lifting and more particularly to an apparatus for inverting an otherwise upright container for emptying the contents thereof.

The art of lifting has been practiced in an industrial environment so as to lift and empty contents of containers for further processing thereof. Examples include emptying supply containers of nuts, bolts and the like onto a work surface; and lifting and emptying containers of liquid products such as dyes and solvents into processing baths.

On a more wide-spread scale dumping apparatuses are used for emptying the contents of refuse containers into transportation vehicles by municipal refuse services. Examples of such technology include U.S. Pat. No. 3,095,101 to Zoller; U.S. Pat. No. 3,417,888 to Naab; U.S. Pat. No. 3,732,997 to Reavis et al; U.S. Pat. No. 3,894,642 to Shive; U.S. Pat. No. 3,804,277 to Brown et al.; U.S. Pat. No. 2,592,085 to Van Doorne; U.S. Pat. No. 4,422,814 to Borders.

While all of these prior art devices are functional for their particular environment, a need exists for continued improvement.

SUMMARY OF THE INVENTION

It is thus an object of this invention to provide a novel apparatus for inverting containers. It is a further object of this invention to provide such an apparatus which has a high measure of reliability and endurance.

These as well as other objects are accomplished by an apparatus for inverting a container wherein a platform has laterally spaced rollers which ride within channel guides having a lower vertical portion and an upper arcuate portion. The lateral rollers ride within the channel guides from the platform being lifted and when reaching the upper arcuate portion, invert the container for emptying the contents thereof.

DETAILED DESCRIPTION

In accordance with this invention, it has been found that an apparatus for inverting containers may be produced with a minimum of moving parts whereby those parts that activate the mechanisms are both simple and reliable, thereby provide long life and ease of maintenance. Various other advantages and features will become apparent from a reading of the following description given with reference to the various figures of drawings.

Figure 1:
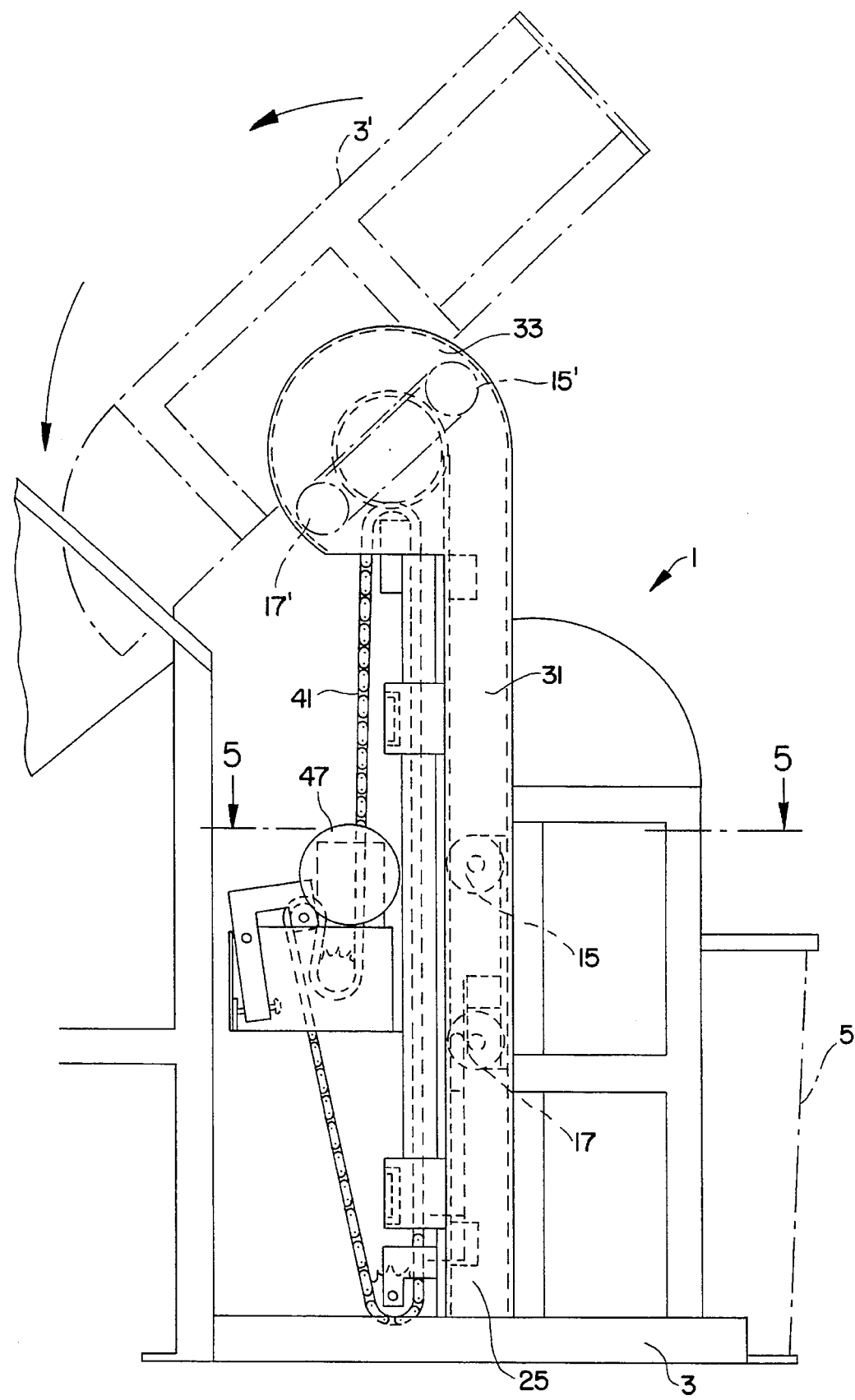
FIG. 1 of the drawings is a side view of the apparatus of this invention illustrating the operation thereof in two positions.

FIG. 1 of the drawings illustrates the apparatus 1 in accordance with this invention. The apparatus comprises a platform 3 for supporting a container 5 illustrated in phantom. Container 5 in actuality is strapped into position so that when it reaches the dumping position illustrated at 3', it is retained within the platform 3.

Figure 2:
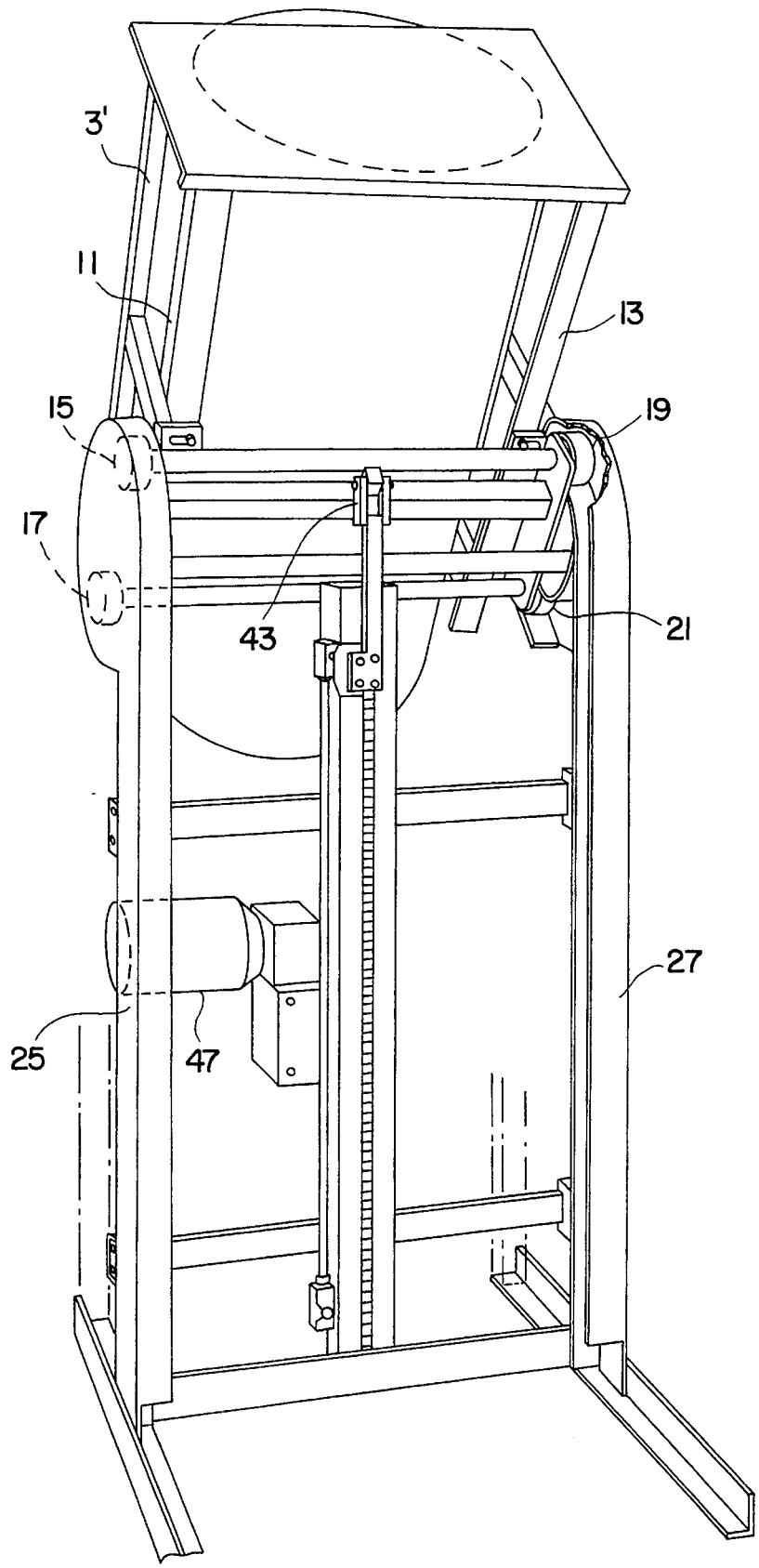
FIG. 2 of the drawings is a perspective view of the apparatus of the invention in the inverted position.

Referring to FIG. 2 of the drawings which illustrates the platform 3' in its dumping position, it is seen that the platform has lateral sides 11 and 13 which have pairs of rollers 15, 17, 19 and 21 mounted thereon.

Figure 3:
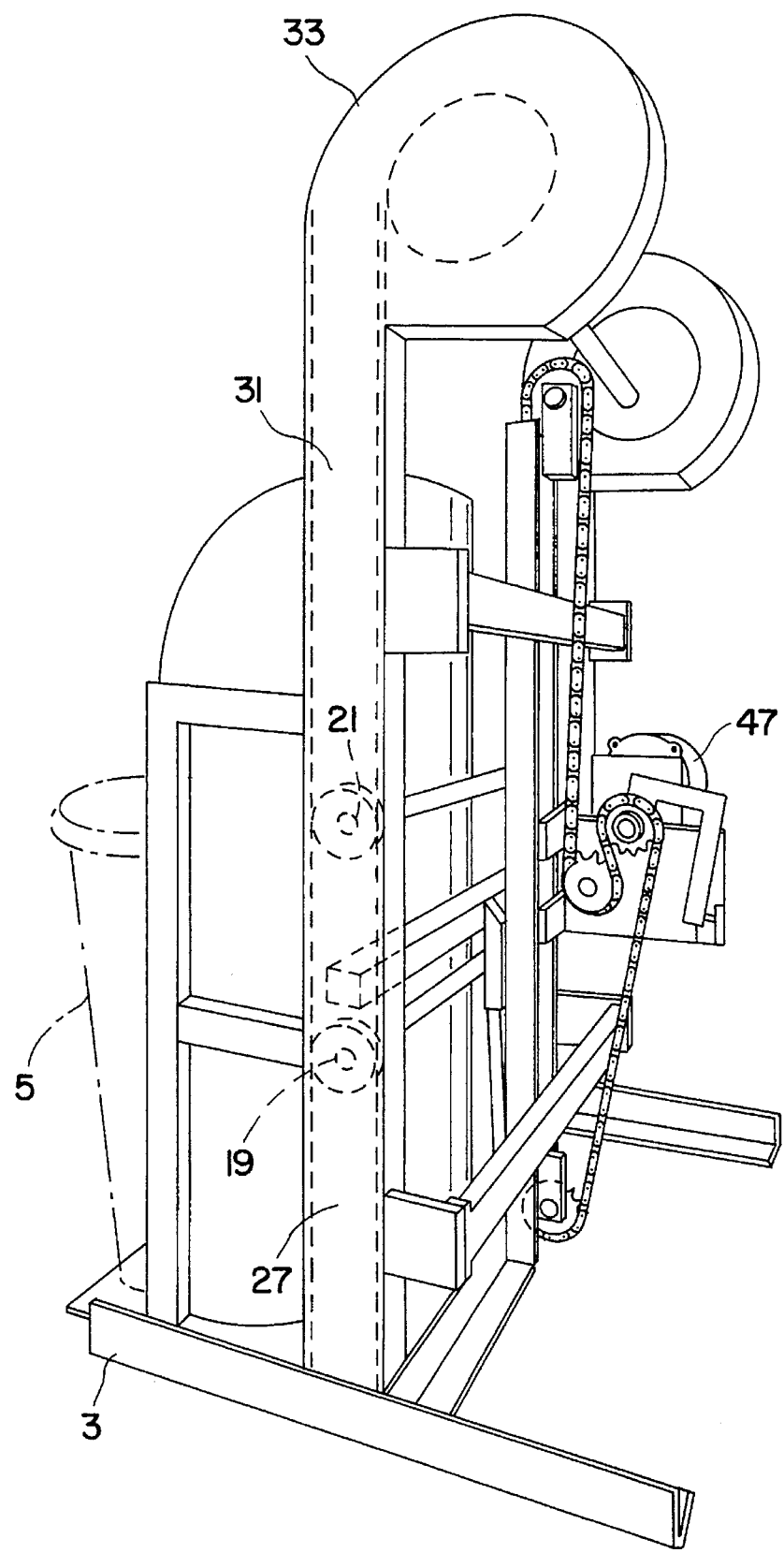
FIG. 3 of the drawings is a side perspective view of the apparatus of this invention from the opposite side of that illustrated in FIG. 1.
Figure 4:
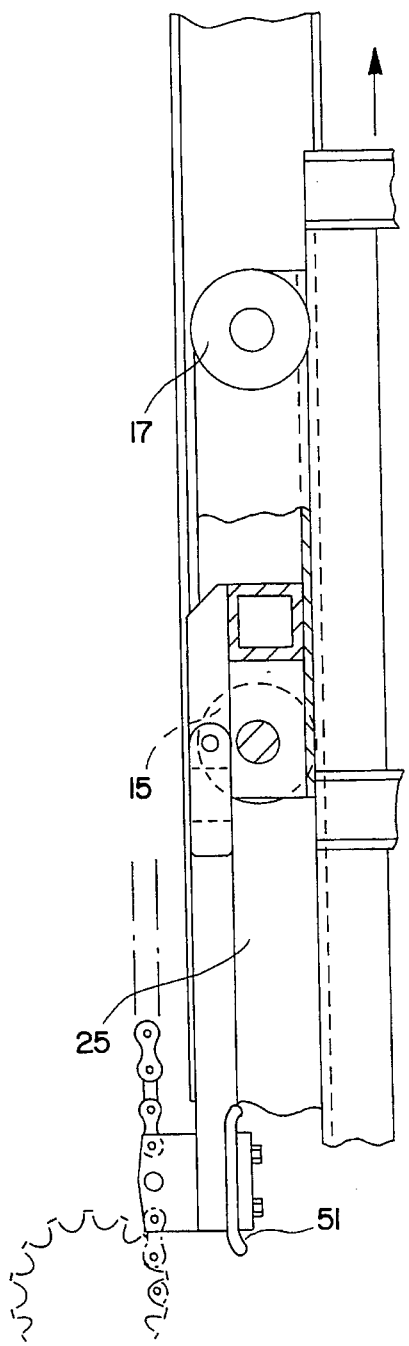
FIG. 4 of the drawings is an enlarged partial side view of a section of the apparatus.

Adjacent the lateral sides 11 and 13, are channel guides 25 and 27. By referring more specifically to FIG. 3, it is seen that rollers 19 and 21 ride within channel guide 27 and in a like manner, rollers 15 and 17 ride within channel guide 25. This is more easily seen in FIG. 4 which is a partial expanded view of the channel guide 25 and associated rollers 15 and 17. Each channel guide has a lower vertical section 31 and an upper arcuate section 33, which tangentially diverges from the lower vertical portion 31. The arcuate portion 33 preferably arcs for at least 180 degrees, and as illustrated in FIG. 1, may arc approximately 220 degrees with the only limitation being the physical containment of the arcuate portion.

Lifting means in the form of a chain drive 41 are attached to the platform 3 at 43, best illustrated in FIG. 2. The drive means are driven by a standard motor 47 which is manually operable, but which may include limits such as 51, illustrated in FIG. 4.

Figure 5:
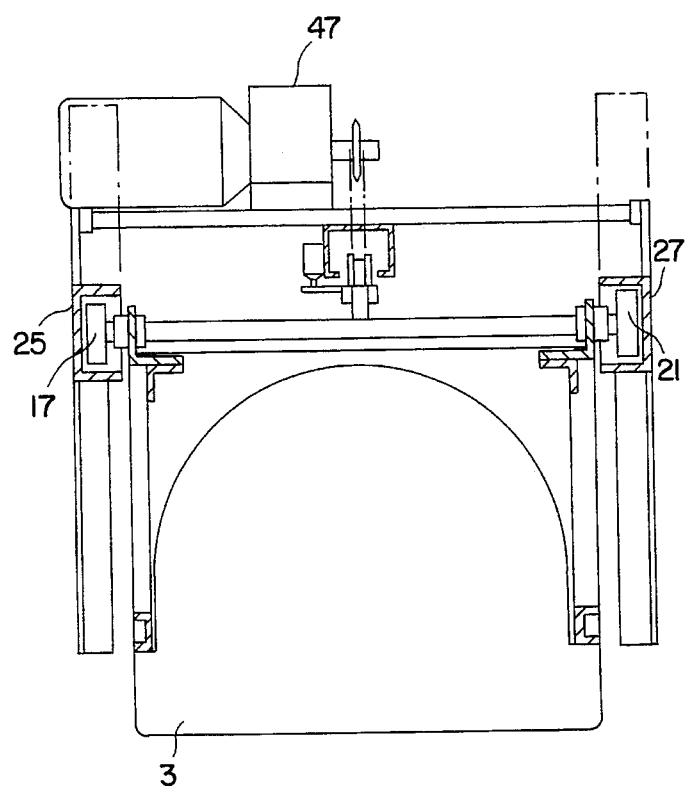
FIG. 5 of the drawings is a cross-sectional view along the line 5—5 of FIG. 1.

FIG. 5 of the drawings is a cross-sectional view along the line by 5 of FIG. 1 and illustrates the platform 3 and the upper rollers 17 and 21 within their appropriate channel guides 25 and 27.

It is thus seen that when the platform 3 is in the horizontal position, as illustrated at 3 in FIG. 1, rollers are in the lower vertical portion 31 of channel guide 25. Upon activation of lifting means 41, platform 3 is lifted and rollers 15 and 17 progress upwardly through the vertical portion 31 of channel guide 25 until reaching the upper arcuate portion 33. Rollers illustrated in the arcuate portion 15' and 17' are separated by the inner diameter of the arc of the channel guide and thereby follow the arc of the guide and invert the platform into the position indicated at 3'. At this point, the contents of any container such as 5 on the platform in the 3' position, are emptied into a desirable location.

After emptying the container, the process is reversed by reversing the action of lifting means 41 to thereby cause platform 3' to be rotated into a upright position and returned to the position indicated by container 5 in FIG. 1.

It is thus seen that the apparatus of this invention provides a novel apparatus for inverting containers which it does in a manner providing for reliability and endurance. As many variations become apparent to those who are skilled in the art from a reading of the foregoing description which is exemplary in nature, such variations are embodied within the spirit and scope of this invention as defined by the following appended claims.

That which is claimed is:

1. An apparatus for inverting a container, comprising:

a platform for supporting the container to be inverted, said platform having lateral sides;

vertically spaced pairs of rollers on each lateral side of said platform;

supports adjacent each lateral side of said platform, each of said supports being constructed as a channeling guide having an inturned flange on an outer face thereof, said outer face being flat, and said supports extending vertically upwardly from a lower vertical portion and terminating in an upper arcuate inverting portion which forms an arc extending tangentially more than 180° from said lower vertical portion;

a single driven chain extending between upper and lower sprockets and, positioned between said supports, said chain being driven by rotary driven means located intermediate the sprockets;

said vertically spaced pairs of rollers matingly engaging and riding in said supports, whereby said single driven chain lifts said platform vertically upwardly until said pairs of rollers reach said upper arcuate portion of said supports whereby said platform inverts from a horizontal orientation to a vertical dumping orientation by the movement of said rollers and said upper arcuate portion.

* * * * *